US006588762B2

(12) United States Patent
Boone et al.

(10) Patent No.: US 6,588,762 B2
(45) Date of Patent: Jul. 8, 2003

(54) LATHE CUT FACE SEAL AND METHOD FOR SEALING IRREGULARLY SHAPED CAVITY

(75) Inventors: Nick Boone, Ames, IA (US); Larry Walker, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/997,826

(22) Filed: Nov. 29, 2001

(65) Prior Publication Data
US 2003/0098548 A1 May 29, 2003

(51) Int. Cl.⁷ ................................. F16J 15/02
(52) U.S. Cl. ...................... 277/312; 277/630; 277/643; 277/650; 29/888.049
(58) Field of Search ................... 277/312, 313, 277/630, 641, 642, 643, 650; 29/888.049, 27 R; 418/149; 417/902; 123/195 C, 198 C; 220/241, 242, 378, 287

(56) References Cited

U.S. PATENT DOCUMENTS

| 2,649,740 | A | * | 8/1953 | Murray et al. ............... 418/39 |
|---|---|---|---|---|
| 3,491,727 | A | * | 1/1970 | Bensinger ................. 418/61.2 |
| 3,671,046 | A | * | 6/1972 | Hagmann ................... 277/641 |
| 3,713,759 | A | * | 1/1973 | Pollman et al. ............. 418/71 |
| 3,837,320 | A | * | 9/1974 | Maekawa ................... 123/242 |
| 3,942,805 | A | | 3/1976 | Sundqvist |
| 3,955,448 | A | * | 5/1976 | Mundy ........................ 82/1.11 |
| 3,961,404 | A | * | 6/1976 | Goloff et al. .......... 29/888.049 |
| 3,973,468 | A | | 8/1976 | Russell, Jr. |
| 3,986,797 | A | * | 10/1976 | Kopf .......................... 417/420 |
| 4,090,820 | A | * | 5/1978 | Teruyama ..................... 418/1 |
| 4,182,602 | A | * | 1/1980 | Dworak et al. ............. 418/132 |
| 4,256,314 | A | | 3/1981 | Berglund et al. |
| 4,358,260 | A | * | 11/1982 | Joyner ........................ 418/132 |
| 4,636,155 | A | * | 1/1987 | Francis ....................... 418/132 |
| 4,866,934 | A | * | 9/1989 | Lindstedt ..................... 60/321 |
| 5,076,557 | A | | 12/1991 | Beatenbough et al. |
| 5,145,190 | A | | 9/1992 | Boardman |
| 5,201,637 | A | * | 4/1993 | Folland et al. .............. 417/218 |
| 5,297,804 | A | | 3/1994 | Siegrist et al. |
| 5,511,518 | A | | 4/1996 | Jain et al. |
| 6,010,321 | A | * | 1/2000 | Forsythe et al. ............ 418/102 |
| 6,168,405 | B1 | * | 1/2001 | Nosenchuck ............... 418/61.2 |
| 6,439,581 | B1 | * | 8/2002 | Chang ......................... 277/614 |
| 6,533,088 | B2 | * | 3/2003 | Hinkel ....................... 192/3.29 |

* cited by examiner

Primary Examiner—Anthony Knight
Assistant Examiner—Alison K. Pickard

(57) ABSTRACT

A lathe cut sealing ring includes a substantially cylindrical ring of elastomeric material formed about a central axis. The ring includes a rectangular cross-section and has an inner diameter, an outer diameter, opposite planar upper and lower surfaces, and a plurality of angularly spaced positioning ribs protruding inwardly from the inner diameter. This sealing ring and the groove in which it is located can advantageously be formed with simple and cost-effective lathe cutting operations.

2 Claims, 6 Drawing Sheets

LATHE CUT FACE SEAL AND METHOD FOR SEALING IRREGULARLY SHAPED CAVITY

BACKGROUND OF THE INVENTION

The present invention relates to the field of hydraulic units, such as pumps and motors. More particularly, this invention relates to a means and method for sealing an irregularly shaped cavity in the housing of a hydraulic unit, such as an open circuit axial piston pump.

Conventional open circuit axial piston pumps often have an irregularly shaped (non-circular) cavity in the housing for receiving the cylinder block kit or pumping portion of the unit, as well as the servo piston and bias piston that position the swashplate to establish the fluid displacement of the unit. Although the required cavity has a large circular central portion for accommodating the cylinder block kit, opposite ear-like portions extend outwardly to accommodate the bias piston and servo piston respectively. Since the overall cavity is irregular or non-circular, use of an O-ring with a circular overall shape tends to increase the size of the housing and therefore undesirably increases the package size of the hydraulic unit. Gaskets have been tried to seal the area around the irregular cavity, but the leakage potential is often undesirably high, especially when the package size requirements do not allow a sufficiently large effective gasket sealing area. The shortcomings of gaskets have lead some pump manufacturers to use molded O-rings to face seal the non-circular area. However, due to the high cost of molds and tooling, molded O-rings are relatively expensive. This is especially true if a non-circular cross-section O-ring is desired. Thus, there is a need for an improved means and method for sealing the irregularly shaped housing cavity of a hydraulic unit.

Therefore, a primary objective of the present invention is the provision of an improved means and method for face sealing around an irregularly shaped cavity.

A further objective of this invention is the provision of a face sealing ring and groove arrangement that can be produced with low-cost lathe operations instead of more expensive molding and milling operations.

Another objective of this invention is the provision of a single lathe cut face seal for sealing the irregular area between the housing and end cap of a hydraulic pump.

Another objective of the present invention is the provision of a lathe cut sealing ring that has a rectangular cross-section and positioning ribs on its inside diameter for better retention and pressure containment.

These and other objectives will be apparent from the drawings, as well as from the description and claims that follow.

BRIEF SUMMARY OF THE INVENTION

The invention relates to a means and method for sealing an irregularly shaped cavity in a hydraulic unit. A sealing ring includes a substantially cylindrical ring of elastomeric material formed about a central axis. The ring has a rectangular cross-section, opposite planar upper and lower surfaces defining a nominal axial thickness therebetween, and an outer diameter and an inner diameter with a ring axis centrally located therebetween. The inner diameter has a plurality of angularly or circumferentially spaced positioning ribs formed thereon and protruding inwardly therefrom. The ribs have an arcuate profile in a plane perpendicular to the central axis. Advantageously, the sealing ring of this invention and the groove into which it fits, can be formed by lathe cutting operations. Thus, a reliable and cost-effective face sealed joint can be provided. The method of providing such a joint is also disclosed herein.

DETAILED DESCRIPTION OF THE INVENTION

Figure 1:
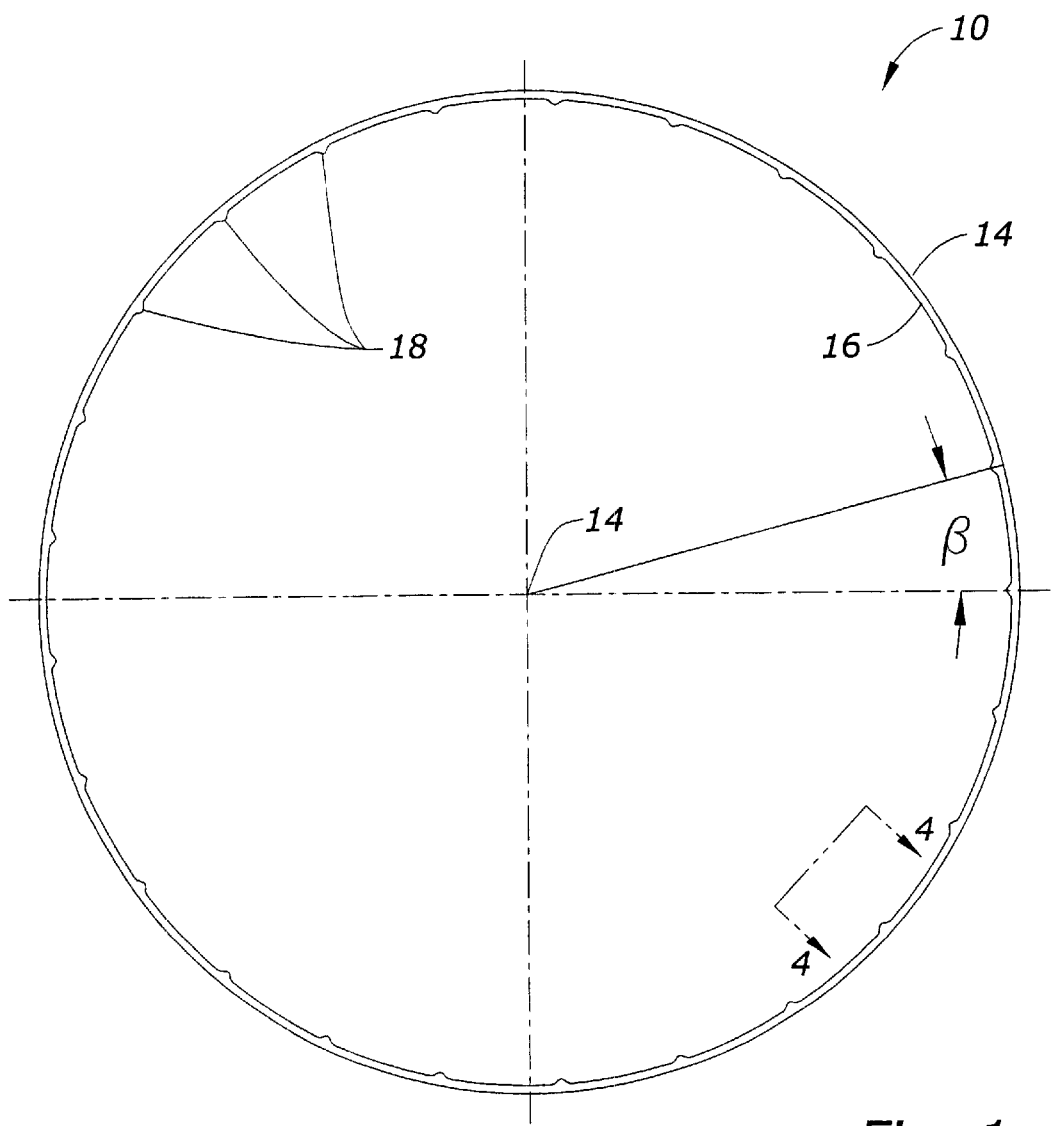
FIG. 1 is a top plan view of the sealing ring of the present invention.
Figure 2:
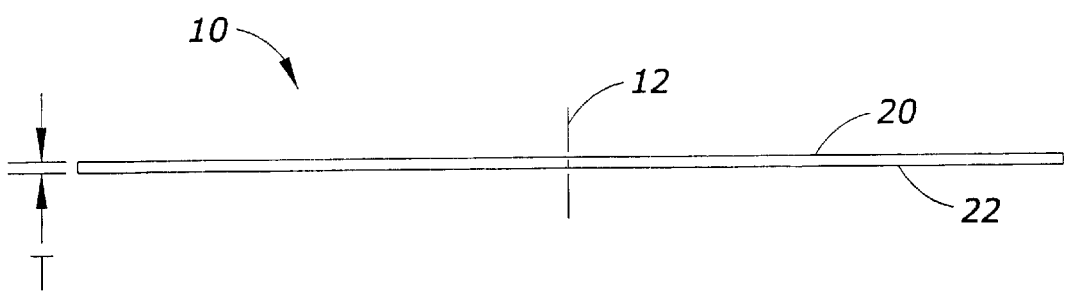
FIG. 2 is a side elevational view of the face sealing ring of FIG. 1.

In FIGS. 1–4, the sealing ring 10 of the present invention is generally designated by the reference numeral 10. The sealing ring 10 is substantially cylindrical and has a central axis 12, an outer diameter 14 and an inner diameter 16. The outer diameter 14 and the inner diameter 16 are preferably concentric with each other and the central axis 12. Thus, a ring axis 17 is centrally located between the outer and inner diameters 14, 16. The sealing ring 10 has a nominal width W across the outer and inner diameters 14, 16. The ring 10 includes a plurality of circumferentially or angularly spaced positioning ribs 18 formed on the inner diameter and protruding inwardly therefrom. The ribs 18 preferably have an arcuate profile in a plane perpendicular to the central axis 12. In the preferred embodiment shown, the ribs 18 are equally spaced along the periphery of the inner diameter 16 and the spacing or angle β therebetween is approximately 14 degrees. Of course, other spacing can be used without detracting from the invention.

The sealing ring 10 has a rectangular cross-section. The sealing ring includes opposite, preferably parallel, planar upper and lower surfaces 20, 22 that define a nominal axial thickness T therebetween. The sealing ring 10 has a continuous uninterrupted rectangular cross-section in a plane extending perpendicular to the ring axis 17 at a location remote from the ribs 18. The rectangular cross-section can be square.

The sealing ring 10 is formed of an elastomeric material, preferably a fluorocarbon material. In the best mode of the invention, the preferred material for the open circuit pump housing application is 75 Durometer fluorocarbon AMSR 83248 Type 1—Class 1. This material is available from Parker Hannifin Corp. of Goshen, Ind., U.S.A. Of course, other well known materials such as nitrile, Buna N, etc. may also be used without detracting from the invention if the material can withstand the desired operating conditions.

Figure 3:
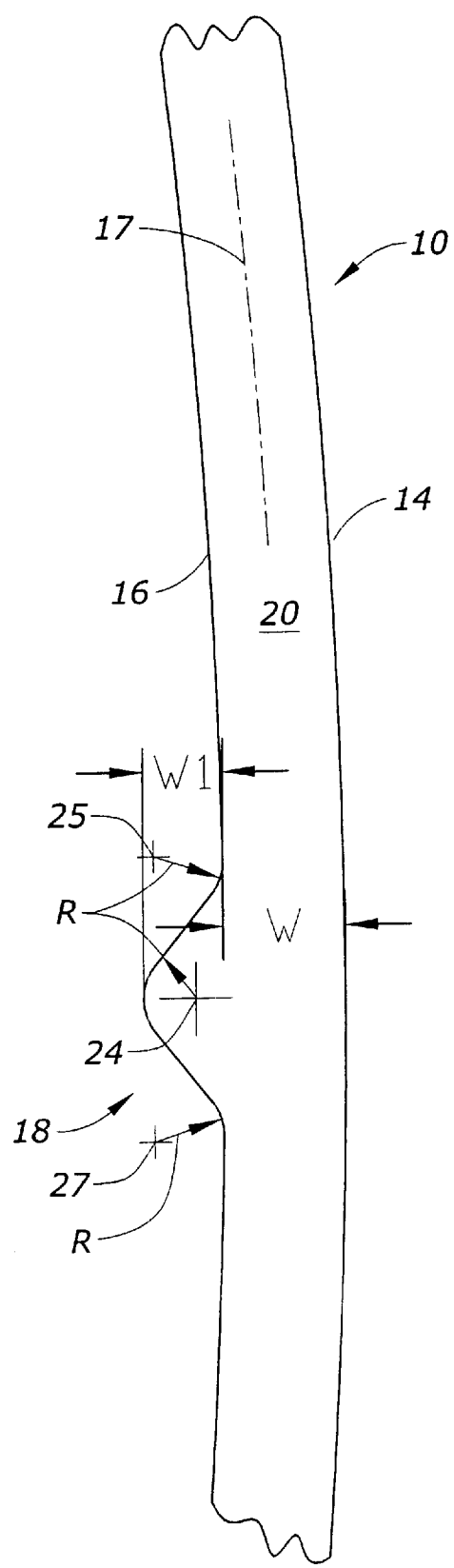
FIG. 3 is an enlarged partial top plan view showing one of the positioning ribs of the sealing ring of FIG. 1.
Figure 4:
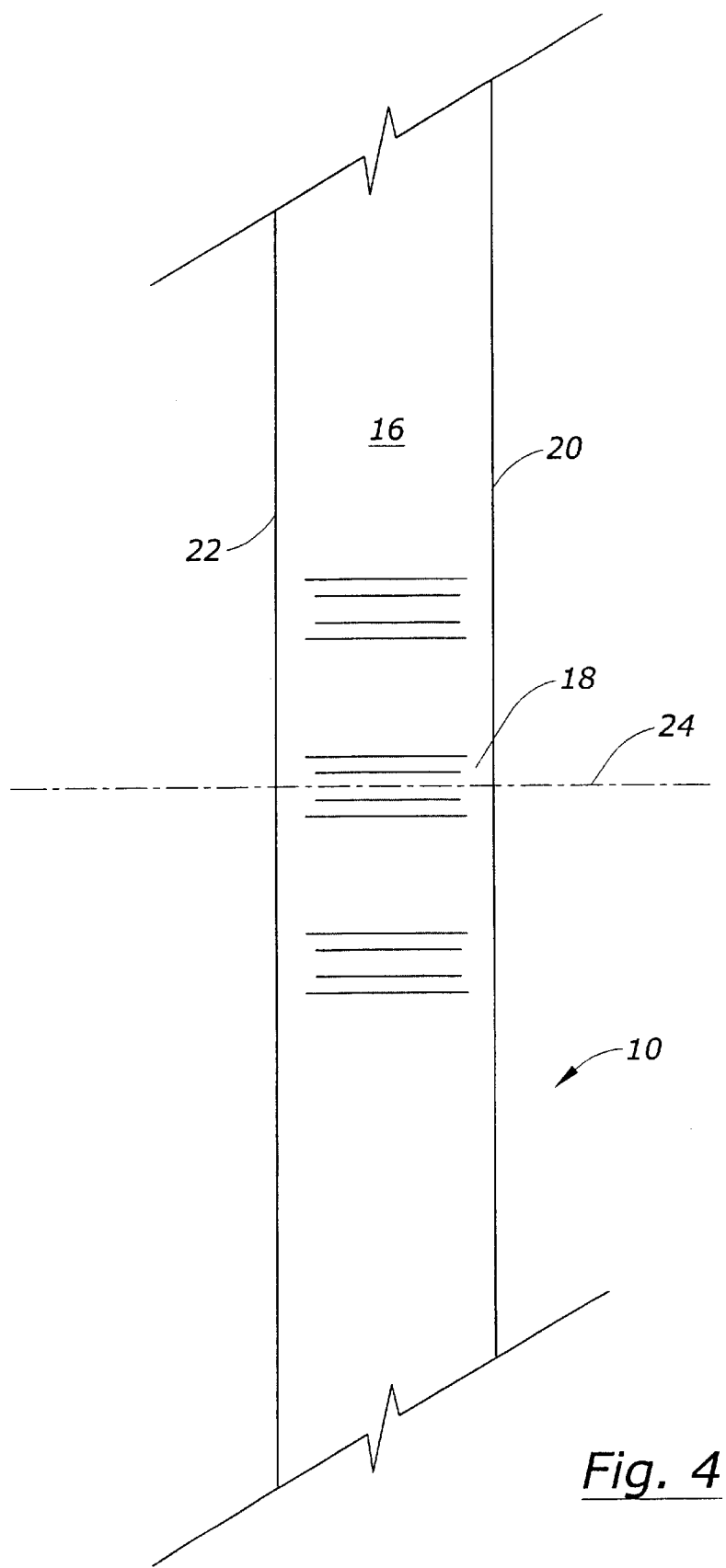
FIG. 4 is a side elevational view of one of the positioning ribs taken along line 4—4 in FIG. 1.

FIGS. 3 and 4 illustrate the construction of the positioning ribs 18 in greater detail. A radius R in three places as shown in FIG. 3 defines each positioning rib 18. A radius R extends from a center axis 24 as shown. The inside radiuses that blend the rib 18 with the inner diameter 16 are formed about center axes 25 and 27 respectively. The rib 18 preferably protrudes from the inner diameter 16 by a height or width W1 that is less than the nominal width W of the ring 10. More preferably, the center axes 24, 25, 27 and the radius R are selected so that the width W1 is approximately two-thirds of the nominal width W of the ring 10.

The method for fabricating the sealing ring 10 of this invention is quick, easy and cost-efficient. The sealing ring 10 is formed by a process of lathe cutting through a hollow elongated tubular extrusion perpendicular to a central longitudinal axis thereof. The positioning ribs 18 are formed in the extrusion process and the flat planar upper and lower surfaces 20, 22 are formed by cutting the extrusion on a lathe. This process relies on relatively inexpensive extrusion dies and lathe cutting tooling, rather than more expensive injection molds.

Figure 5:
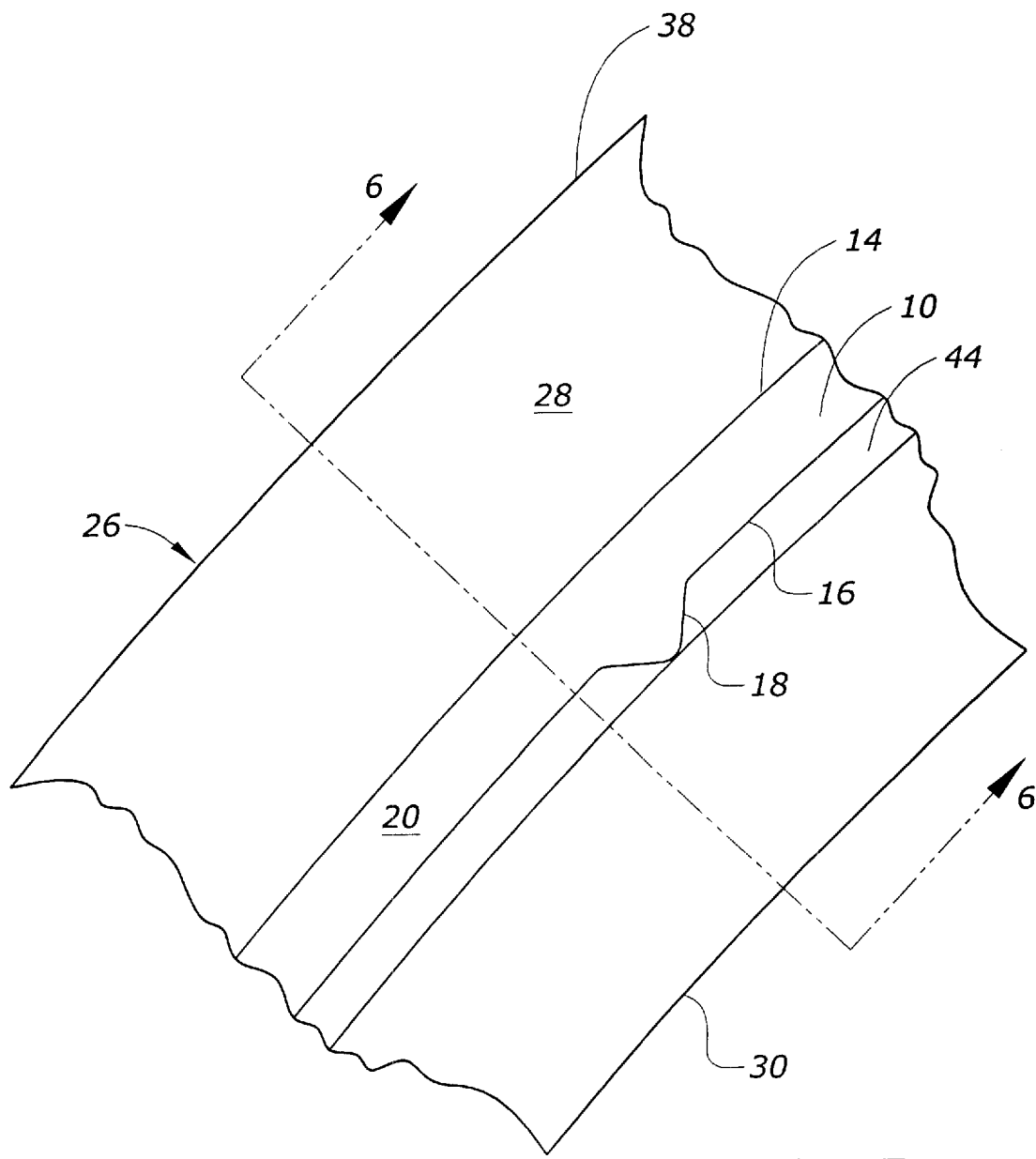
FIG. 5 is a top plan view of the sealing ring of FIG. 1 installed in a groove in the housing.
Figure 6:
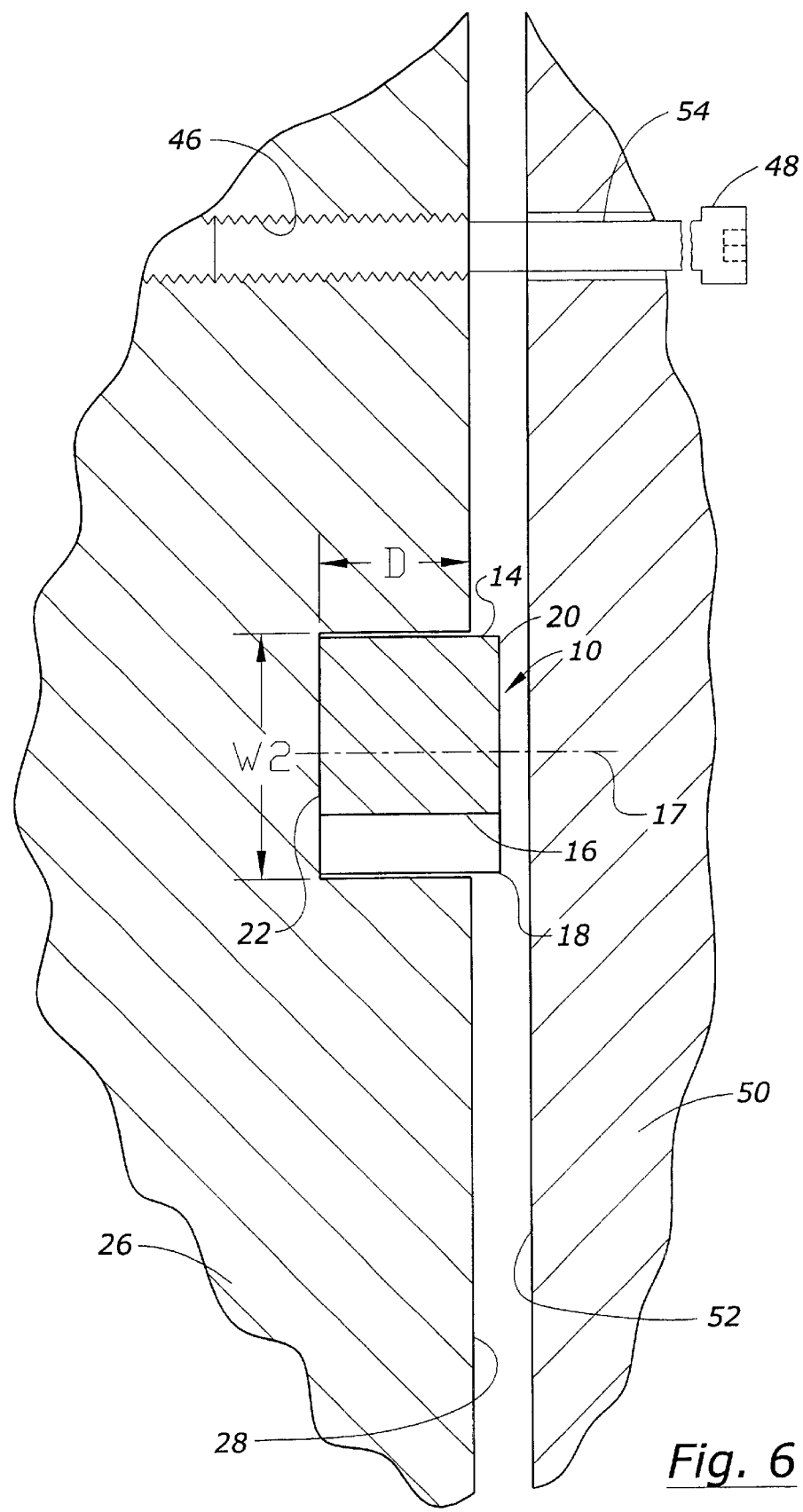
FIG. 6 is a cross-sectional view of the groove and the sealing ring taken along line 6—6 in FIG. 5. An end cap is also shown adjacent to the sealing ring.
Figure 7:
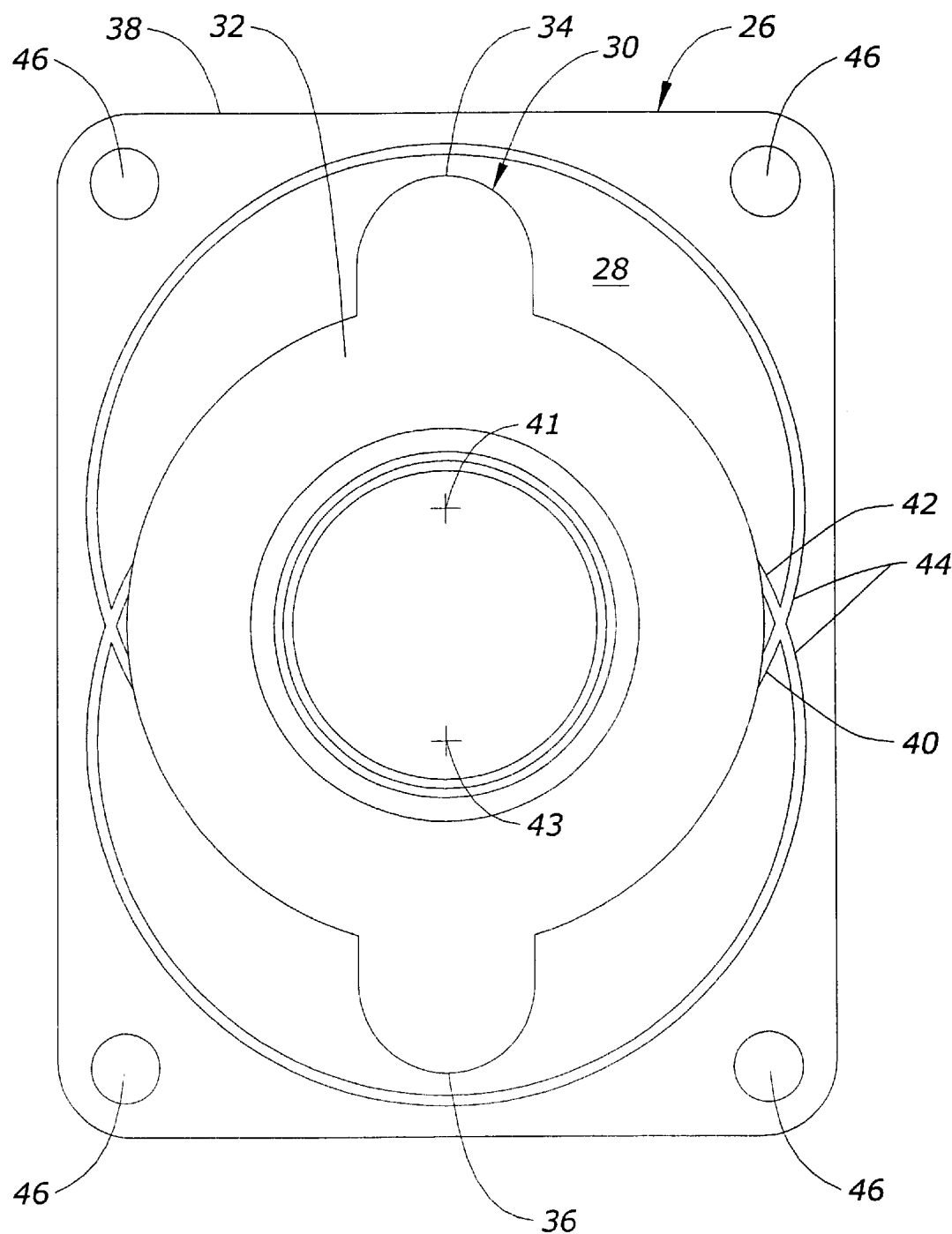
FIG. 7 is a top plan view of the rear end of an open circuit pump housing showing the irregular shaped cavity and the seal-receiving groove formed therearound according to this invention.

FIGS. 5–7 illustrate the method of using the sealing ring 10 of this invention to create an improved sealed joint. A pump housing 26 has a substantially planar rear end surface 28 with an irregularly shaped cavity 30 formed therein. The cavity 30 has a circular portion 32 for receiving the cylinder block kit of the pump (not shown). Ears 34, 36 extend in opposite directions from the circular portion 32 to accommodate the servo piston and bias piston of the pump (not shown). The surface 28 has an outer peripheral edge 38. A first circular groove 40 having a substantially rectangular cross-section and a central axis 41 is cut in the rear surface 28 of the pump housing 26 during a lathe cutting operation. A second circular groove 42 having a substantially rectangular cross-section and a central axis 43 is cut in a second lathe cutting operation. The grooves 40, 42 preferably have a uniform depth D and together form a combined perimeter groove 44 that extends around the irregularly shaped cavity 30 and receives the sealing ring 10. The grooves 40, 42 and 44 preferably have a width W2 that is slightly greater than the width of the sealing ring 10 (W1+W). The depth D of the grooves 40, 42 and 44 is preferably less than the thickness T of the sealing ring 10.

A plurality of threaded holes 46 extend into the surface 28 of the pump housing 26 at locations disposed radially outwardly from the perimeter groove 44. As best seen in FIG. 6, an end cap or cover 50 that has a substantially planar pump sealing face 52 is positioned adjacent to the sealing ring 10 and the rear end surface 28 of the pump housing 26. A plurality of bolts 48 are then inserted through clearance holes 54 in the end cap to sealingly attach it to the pump housing 26. As the pump sealing face 52 of the end cap 50 is clamped against or drawn toward the surface 28 of the pump housing 26, the sealing ring 10 is squeezed to provide a face seal at the interface. The positioning ribs 18 tend to contact the inner periphery of the groove 44 and urge the outer diameter 14 of the sealing ring 10 outwardly, which improves the pressure retention capabilities of the joint.

In a broad sense, the present invention provides a method for sealing an irregularly shaped (non-circular) entrance to a cavity 30 between first and second members 26, 50. The method involves lathe turning a plurality of radially overlapping circular annular grooves 40, 42 with rectangular cross-sections in a planar surface 28 or 52 of one of the members 26, 50 so as to surround or circumscribe the irregular entrance of the cavity 30 to be sealed. Together the grooves 40, 42 form a non-circular outer seal-receiving groove 44. The assembler installs the lathe cut sealing ring 10 of this invention in the seal-receiving groove 44 and clamps the first and second members 26, 50 together until the sealing ring 10 provides a suitable face seal. Those skilled in the art will appreciate that the grooves 40, 42 and 44 could be lathe cut into the cover or end cap 50 rather than into the pump housing 26. In that case, the sealing ring 10 would be installed in the cover or end cap 50.

Thus it can be seen that the present invention at least achieves its stated objectives.

What is claimed is:

1. A method for sealing hydraulic fluid in a cavity having a non-circular entrance at a planar surface of a first member, the method comprising the steps of:

providing a cover having a planar surface thereon adapted to matingly engage the planar surface of the first member in full covering relation to the entrance of the cavity;

forming a non-circular seal-receiving groove in one planar surface of the planar surfaces of the first member and the cover, the seal-receiving groove being capable of completely circumscribing the entrance of the cavity and having an inner periphery, an outer periphery, a given depth and a given width;

the seal-receiving groove being formed in a series of lathe cutting operations wherein a plurality of radially overlapping circular grooves are cut to the given depth into said one planar surface;

installing a lathe cut face sealing rectangular cross-section ring of elastomeric material in the seal-receiving groove, the ring having a thickness greater than the depth of the seal-receiving groove and a width less than the width of the seal-receiving groove;

superimposing the planar surface of the cover with the planar surface of the first member such that the sealing ring is located therebetween therebetween and fully circumscribes the entrance to the cavity;

clamping the planar surfaces of the first member and the cover together by applying clamping forces at a plurality of locations spaced radially outwardly from the outer periphery of the seal-receiving groove.

2. The method of claim 1 wherein the seal-receiving groove is formed in the planar surface of the first member.

* * * * *